Patented Jan. 6, 1948

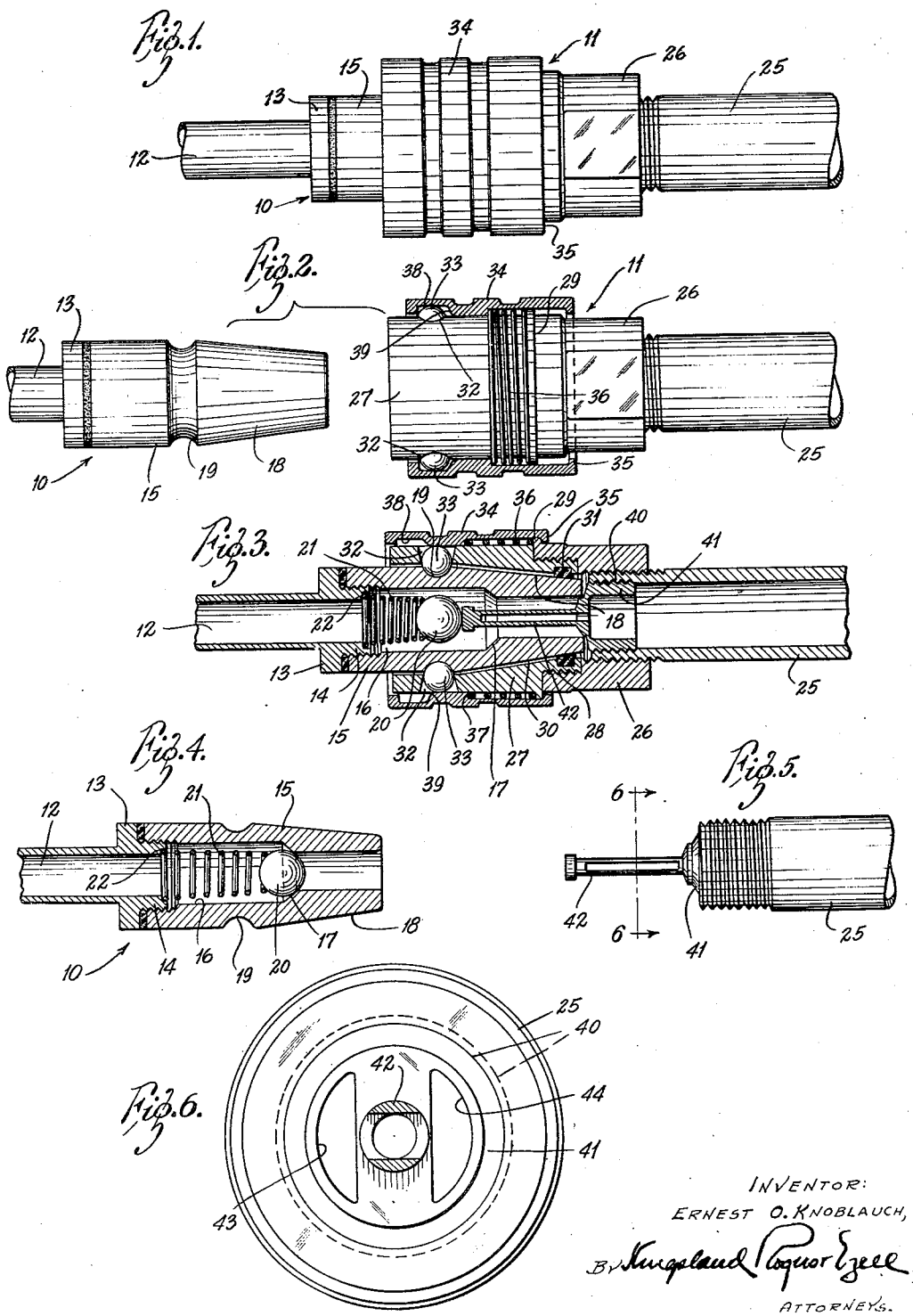
Jan. 6, 1948.     E. O. KNOBLAUCH     2,434,167
VALVED COUPLING
Filed May 23, 1945.
INVENTOR:
ERNEST O. KNOBLAUCH,
ATTORNEYS.

2,434,167

UNITED STATES PATENT OFFICE 2,434,167

VALVED COUPLING

Ernest O. Knoblauch, St. Louis, Mo.

Application May 23, 1945, Serial No. 595,449

1 Claim. (Cl. 284—19)

The present invention relates to a valved coupling. More particularly, it relates to a quick acting coupling for use between two fluid lines.

It is an object of the invention to provide, in a quick acting coupling, a valve means that closes off a disconnected coupling element as soon as the coupling is opened.

A particular object is to provide a coupling for use in a vacuum line, with a valve in the element connected to the source of the vacuum, which is automatically closed as soon as the coupling is broken.

A particular object is to provide a valve of this kind that may be readily inserted into presently existing couplings, without substantial modification thereof. A particular object is to provide a coupling of this kind with an automatic shut-off valve for use in connection with vacuum brakes, particularly with vacuum brakes on tractor trailers.

It is a further object to provide such a coupling that will prevent the intake of air into the vacuum line as soon as the coupling is opened, thereby eliminating the danger of introduction of quantities of air into the system that would damage the vacuum pump and the other parts thereof. It is a further object to provide such a valved coupling that will eliminate the necessity of closing manual valves prior to opening of the coupling. It is a further object to provide a valve of this kind which will substantially eliminate the intake of any air into the vacuum system whenever the coupling is broken.

A further object is to provide a valve of this kind that will prevent the intake of dirt into the vacuum line with its consequent interference with the operation of the vacuum system, the check valves and the other elements used therein.

Other objects will appear in the course of the description to follow, wherein:

Fig. 1 is a side elevation of the coupling in closed position;

Fig. 2 is a view of the coupling in separated condition, with the outer sleeve element shown in section;

Fig. 3 is a longitudinal, diametrical section through both elements of the coupling in closed position;

Fig. 4 is a longitudinal section of the plug element of the coupling with its valve closed;

Fig. 5 is a view of the pin insert for operating the ball valve in the plug element; and Fig. 6 is a transverse view through the socket element of the coupling alone, taken substantially on the line 6—6 of Fig. 5.

The coupling in general comprises a plug 10 and a socket 11. The plug is shown in more detail in Figs. 2 and 4, and is normally adapted to be connected to the vacuum system on the tractor, when this device is used in connection with tractor brakes. It has a fitting 12 for union with the vacuum line. This fitting 12 terminates in a flange 13 from which an externally threaded portion 14 projects. A hollow plug element 15 is internally threaded to be secured to the projecting portion 14. The plug element 15 has an internal bore 16 therethrough, reduced between its ends to form a valve seat 17. The right hand end of the element 15, as it appears in the drawings, is tapered at 18 for interfitting with the socket member, as will appear. At the larger end of the tapered portion, a peripheral groove 19 surrounds the plug element for a purpose to be described.

A ball valve 20 fits easily within the enlarged part of the bore 16 and is engageable against the valve seat 17. This ball valve 20 is normally urged toward its seat by a coil spring 21 resting against it and also abutting against a shoulder 22 within the outer edge of the projecting portion 14.

The plug member 10 is adapted to be inserted into the socket member 11, wherein it may be securely held. The socket member is adapted to be connected to a pipe 25 that leads to the brake booster cylinder on the tractor. To this end, there is conventionally employed a composite socket member formed of a first union 26 and a second tapered socket element 27, the two being secured together as by threads 28. The union member 26 has a peripheral flange 29 for a purpose to be described.

The socket element 27 has a tapered socket 30 extending inwardly from one end, with a plug receiving sealing washer 31, of rubber or the like, seated in a groove therearound adjacent its smaller end. The outer end of the socket element 27 has two oppositely disposed tapered holes 32 therein. Each hole receives a ball 33. These balls 33, as appears from Fig. 3, are movable radially inwardly to engage within the peripheral groove 19 on the plug member 15, when the plug member is inserted into the socket.

The balls are confined by a sleeve 34. This sleeve has an inturned flange 35 at its right end that engages the flange 29 on the union member 26 to limit the movement of the sleeve 34 to the left in Fig. 3. It is normally urged its maximum distance to the left by a coil spring 36 that engages against the flange 29 of the member 26, and against a shoulder 37 on the sleeve member.

The sleeve member likewise has a groove 38 around its inner surface adjacent one end, so that, when the sleeve is drawn to the right in Fig. 3, this groove 38 will be disposed radially behind the two balls 33. Thereby these two balls may be displaced radially outwardly to permit withdrawal of the plug member. When the sleeve is moved to the left, the sloping edge of the shoulder 39 at the right side of the groove 38 forces the balls inwardly and holds them there.

The foregoing structure is well known in the art in so far as the locking of the two members together is concerned.

In the present invention, the pipe 25 is tapped out at 40 in its left end, and a cap-like, correspondingly threaded fitting 41 is screwed into the tapped out portion 40. The fitting 41 is hollow and has a hollow pin 42 projecting into the socket member 27. The pin communicates with the interior of the pipe 25. Beside the pin, as shown in Fig. 6, are two additional openings 43 and 44, so that the air may freely pass through the cap member 41.

*Operation*

Assuming that the plug member 10 has its fitting 12 connected to a vacuum line on the tractor of a trailer truck, and the socket member 11 has its pipe 25 connected to the booster cylinder on the trailer itself, the two members may be attached together by drawing the sleeve 34 on the socket member backwardly against the spring 36 to dispose the groove 38 opposite the two balls 33. Then the plug member 10 may be inserted within the socket. Its small end will seat tightly within the seat 31 formed on the inner peripheral surface of the tapered socket member. When it is so seated, the balls 33 may enter into the peripheral groove 19 on the plug member. Thereupon, the sleeve 34 may be released, and, as it is drawn to the left, its shoulder 39 will force the balls 33 into the groove 19, against removal, and thereby will effect locking of the plug and socket together.

When the two members are disposed in the position shown in Fig. 3, the pin 42 will engage the ball valve 20 and displace the same from its seat 17, thereby establishing full communication from the pipe 25 to the pipe 12 leading to the vacuum source. The ball valve will thus be held open whenever the union is connected.

However, whenever it is designed to break the connection, the sleeve 34 is again withdrawn, whereupon the plug member 10 may be pulled out of the socket member 11, because the balls 33 may move into the groove 38. As the plug and socket are separated, the pin 42 is withdrawn from the ball valve 20, and the spring 20 forces the ball valve closed. The spring has enough force to maintain the ball valve closed against atmospheric pressure. Thereby the vacuum line is immediately sealed whenever the parts are separated. The action is so instantaneous that no dirt or substantial amount of air can get into the vacuum line, and is completed before the plug and socket are separated. It will remain thus sealed until the connection is again made with the socket member 11.

It will be seen that this mechanism is adapted to the conventional coupling that is now used. To install this valve arrangement in any presently existing coupling of this type, it is necessary only to tap out the threads 40 and insert the cap member 41, with its integral pin 42, therein. Then the plug 10 is provided with the valve 20 and its associated parts. This completely eliminates the necessity of closing the manual valve in the vacuum line, and, furthermore, it eliminates the column of air that otherwise would be present with a manual valve arrangement between the valve and the open end of the plug member.

What is claimed is:

In a coupling for use with a fluid line, a plug member, means at a back end of the plug member for attaching it to a pipe, an opening extending from said back end of the plug member, axially through said member, said opening having a reduced portion providing a valve seat intermediate its length, the valve seat being disposed to face backwardly of the plug element, a valve insertable from the back of the member into the opening and movable from the seat backwardly, spring means engaging the valve to urge it forwardly against the valve seat, the plug member having a tapered outer surface of reduced diameter toward its forward end, a socket member cooperable with the plug member, the socket member having an internally threaded portion attachable to the end of a pipe and having a tapered inner surface to receive the tapered outer surface of the plug member and to seal therewith, a pin member comprising a fitting having external threads engageable with internal threads on the interior surface of the end of the pipe to which the socket member is attached, and a pin projecting from the fitting and sized to enter the passage in the plug member and displace the valve from its seat when the plug and socket members are engaged together, said pin member having openings to permit passage of fluid therethrough.

ERNEST O. KNOBLAUCH.

REFERENCES CITED

The following references are of record in the file of this patent:

UNITED STATES PATENTS

| Number | Name | Date |
|---|---|---|
| 2,335,007 | Haag | Nov. 23, 1943 |
| 2,305,841 | Carlson | Dec. 22, 1942 |
| 1,427,105 | Handlan | Aug. 29, 1922 |